US005802590A

United States Patent [19]
Draves

[11] Patent Number: 5,802,590
[45] Date of Patent: *Sep. 1, 1998

[54] METHOD AND SYSTEM FOR PROVIDING SECURE ACCESS TO COMPUTER RESOURCES

[75] Inventor: Richard P. Draves, Seattle, Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 355,135

[22] Filed: Dec. 13, 1994

[51] Int. Cl.$^6$ .................................................. G06F 9/45
[52] U.S. Cl. ........................ 711/164; 395/674; 711/163
[58] Field of Search .................................. 395/700, 650, 395/671, 672, 673, 670, 701; 380/23–25; 235/375, 382.5, 382; 364/741.8

[56] References Cited

U.S. PATENT DOCUMENTS

| | | | |
|---|---|---|---|
| 4,885,684 | 12/1989 | Austin | 395/706 |
| 5,138,712 | 8/1992 | Corbin | 395/186 |
| 5,274,644 | 12/1993 | Berger | 370/230 |
| 5,311,593 | 5/1994 | Carmi | 380/23 |
| 5,446,864 | 8/1995 | Burghardt | 711/100 |
| 5,446,881 | 8/1995 | Mammel, Jr. | 707/1 |
| 5,455,953 | 10/1995 | Russell | 395/739 |
| 5,469,556 | 11/1995 | Clifton | 711/163 |

Primary Examiner—Majid A. Banankhan
Attorney, Agent, or Firm—Seed and Berry LLP

[57] ABSTRACT

A method and system for allowing processes to access resources. A kernel of an operating system maintains a system-wide resource table. This resource table contains resource entries. When a resource is allocated, the kernel generates a key for the resource. The key is a very large number so as to prevent a malicious process from gaining unauthorized access to the resource. The kernel also hashes the key to generate an index into the resource table that is used as a handle. The kernel stores the key in a resource entry that is indexed by the handle. The handle\key pair is sent to a process. The process accesses the resources by passing handle\key pairs to the kernel. The kernel compares the passed key with a key that is stored in the resource entry referenced by the passed handle. When the stored key and the passed key match, the process is allowed to access the resource. When the stored key and the passed key do not match, the kernel rehashes the passed key to generate a new handle. The kernel then searches starting at the index of the new handle for a resource entry with a key that matches the passed key. When a key matches the passed key, the process is allowed to access the resource, and the index for the resource entry is returned to the process so that the process can use the index as a handle to access the resource on subsequent resource access requests. When the passed key does not match a key, the process is denied access to the resource.

17 Claims, 11 Drawing Sheets

| | | | | | | | | |
|---|---|---|---|---|---|---|---|---|
| 0 | 4 | 3 | 8 | 9 | 7 | A | 1 | x |
| 5 | 4 | 8 | B | C | D | 8 | 4 | x |
| 2 | 8 | A | B | 6 | 7 | B | D | x |
| 5 | 9 | 1 | 3 | E | E | F | 2 | x |

*Fig. 4*

Resource Table

| | |
|---|---|
| 4100 | 0AB . . . 39 |
| 4200 | 75F . . . D0 |
| 4298 | 5DE . . . 68 |
| 4299 | 690 . . . A1 |
| 4300 | AAB . . . 82 |

*Fig. 5A*

Resource Table

| | |
|---|---|
| 4075 | AAB . . . 82 |
| 4076 | 0AB . . . 39 |
| 4110 | 690 . . . A1 |
| 4125 | 5DE . . . 68 |

*Fig. 5B*

| 4298 |
|---|
| 5DE . . . 68 |

*Fig. 5C*

| 4125 |
|---|
| 5DE . . . 68 |

*Fig. 5D*

METHOD AND SYSTEM FOR PROVIDING SECURE ACCESS TO COMPUTER RESOURCES

TECHNICAL FIELD

The present invention relates to the field of computer systems, and more particularly, to a method and system for ensuring that only authorized processes access resources.

BACKGROUND OF THE INVENTION

Conventional computer systems are often controlled by multi-processing operating systems. These operating systems manage the concurrent execution of various computer programs. Each concurrently executing computer program is referred to as a process. These operating systems also control access to various resources of a computer system. These resources include the central processing unit, main memory, and peripheral devices (e.g., disk drives and printers). The portion of the operating system that is responsible for the allocation and deallocation of these resources is known as the kernel.

Processes frequently need to share resources. For example, a spreadsheet program may need to pass spreadsheet data to a word processing program so that the word processing program can incorporate the spreadsheet data into a document. The spreadsheet program can pass the data to the word processing program using shared memory. To pass the data, the spreadsheet program requests the kernel to allocate a block of memory for use as shared memory. In response, the kernel allocates the memory, maps the block of memory into the address space of the spreadsheet program, and returns to the spreadsheet program a resource identifier that identifies the block of memory. The spreadsheet program then writes the spreadsheet data to the block of memory and requests the kernel to allow the word processing program to share the block of memory. The kernel generates another resource identifier that the word processing program can use to access the block of memory. Once the block of memory is mapped into its address space, the word processing program can access the spreadsheet data.

To help manage the various resources, the kernel maintains a resource table for each process. For each allocated resource, the resource table contains an entry, which identifies the resource. FIG. 1 shows a conventional resource table 100 in which resources are identified by handles. Entry 120 corresponds to an allocated block of memory 130 and contains a pointer to the memory block. The resource identifier that the kernel returns to the process which requested allocation of the resource is an index into the resource table for the process. This index is also known as a handle. The handle 110 contains an index into the resource table. A process that requests the kernel to allocate a resource so that the process can share the resource with other processes is known as a "server" process. Analogously, a process that utilizes a resource that is shared by a server process is known as a "client" process.

To access a resource after it is allocated, a process passes the resource identifier (handle) to the kernel. The kernel uses the handle to access the entry in the resource table that corresponds to the resource. As a process requests the allocation of additional resources, the kernel adds resource table entries and returns the handles to the process.

The use of a handle as a resource identifier is advantageous because it imposes little processing overhead upon the system. Because the handle directly indexes the desired entry of the resource table, the kernel can quickly locate the requested resource. However, the use of a handle as a resource identifier has shortcomings. First, when each process has its own resource table, a handle cannot be simply passed from one process to another to share a resource. Rather, the server process notifies the kernel that one of its resources is to be shared with a client process. The kernel then adds a new entry to the resource table of the client process, sets the entry to identify the shared resource, and sends the handle to the client process. The server process can then access the shared resource using the handle into its resource table, and the client process can access the shared resource using the handle for the newly added entry into its resource table. Second, the use of handles can impose significant memory overhead upon the system. This memory overhead arises because the resource table size cannot be reduced as resources are deallocated. This overhead can be illustrated by assuming that a process has requested to deallocate a resource that corresponds to entry 120 of FIG. 1. To minimize memory usage, the kernel would remove entry 120 and compact the table accordingly (i.e., shift up those entries that are positioned beneath entry 120). However, if the resource table is compacted, then all handles that index entries that are moved would be incorrect. The results of such incorrect handles can be catastrophic (e.g., erasing critical data or causing system failure).

SUMMARY OF THE INVENTION

The present invention is directed to a method and system that provides secure access to resources. The system provides for ensuring that a computer program is authorized to access a computer system resource. The system generates a system-wide resource table that has a resource entry for each allocated resource. Each resource entry contains a preferably non-forgeable key that uniquely identifies the resource. The system generates a handle that is derived from the key and that serves to indicate where the resource entry may be located in the resource table. The system passes both the handle and key (handle\key pair) to a process that has been authorized to access the resource. When the process requests access to the resource, the process identifies the resource with a passed handle\key pair. The use of the handle\key pair allows the system to relocate the resource entry during resizing of the resource table. If the passed handle identifies a resource entry that contains the passed key, the access is granted. If a passed handle does not identify the resource entry that has the passed key, then the resource entry has been relocated. To find the correct resource entry, the system then searches for a resource entry that contains the passed key. If such a resource entry is found, then access to the resource is granted and the index to the resource entry is returned as the new handle. Otherwise, access is denied.

By pairing handles with keys, the present invention provides a secure facility for accessing resources. Moreover, as the handle obviates the need to regenerate a handle for each resource access request, processing overhead is minimized. Since the system can dynamically generate handles, the present invention can dynamically adjust the size of the resource table. As a result, the present invention not only minimizes processing overhead, but minimizes memory overhead as well.

In addition, since a system-wide resource table is used, a server process can share a resource with a client process by simply passing the key or handle\key pair to the client process.

BRIEF DESCRIPTION OF THE DRAWINGS

FIG. 4 is a block diagram that illustrates a key that is used in the preferred embodiment of the present invention.

FIG. 5A is a block diagram that illustrates a resource table having five resource entries.

FIG. 5B is a block diagram that illustrates a resource table having four resource entries.

FIG. 5C is a block diagram that illustrates an example of an original handle\key pair.

FIG. 5D is a block diagram that illustrates an example of an updated handle\key pair.

DETAILED DESCRIPTION OF THE INVENTION

Figure 1:
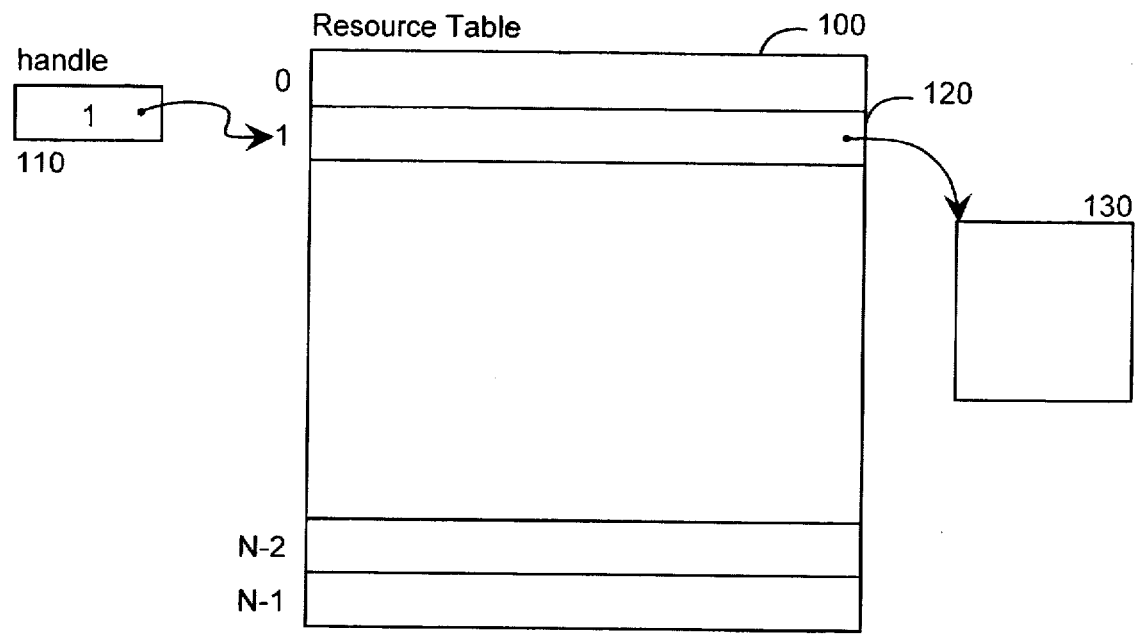
FIG. 1 is a block diagram that illustrates a prior art resource table in which resources are accessed using a handle.

The present invention is directed towards a method and system in a kernel of an operating system for providing secure access to computer system resources while minimizing overhead. In a preferred embodiment, the kernel maintains a system-wide resource table that is a hash table and that contains a resource entry corresponding to each resource allocated by the kernel. The allocated resources are identified by a kernel-generated resource identifier. The system of the present invention uses resource identifiers that contain both a handle and a key (a handle\key pair). The key is a very large number (e.g., 128 bits) that uniquely identifies the resource, and the handle contains an index into the resource table. The key is a randomly generated number that is sufficiently sized so as to render the forging of a key unlikely. The handle is generated by inputting the key into a hash function that generates an index into the resource table. Using linear probing hashing techniques, the kernel determines the index of the next available resource entry. A resource entry corresponding to the allocated resource is stored in the resource table at the determined index. The determined index is used as the handle. The stored resource entry contains a copy of the key. The resource identifier comprising the handle\key pair is passed to the process that requested the allocation of the resource.

When a process wishes to access the allocated resource, it passes the handle\key pair to the kernel. The kernel examines the resource entry indexed by the passed handle to determine whether the passed key is equal to the key in the indexed resource entry. The keys may not be equal for several reasons, including resource table compaction and attempted forgery. When the key contained within the indexed resource entry is not equal to the passed key, the kernel rehashes the passed key to generate an index and searches the resource table starting at that index for a resource entry that contains a key that is equal to the passed key. When no such resource entry is found, the kernel denies the process access to the resource. On the other hand, when a resource entry that contains a matching key is found, the kernel allows the process to access the resource. The kernel also returns the index to be used as a handle to the process, so that the kernel can, on subsequent resource access requests with the new handle\key pair, reduce the likelihood of rehashing the key.

Through the use of handle\key pairs, the present invention provides a system which ensures that only authorized processes are able to access resources. The kernel allows a process access to a resource only when the passed key matches the key for the resource that is stored in the resource entry. Moreover, since the handle is first used to find the resource entry corresponding to the allocated resource, the kernel does not perform the hashing function on every access, and processing overhead is minimized. Furthermore, since the handles can be dynamically regenerated, the kernel can dynamically resize the resource table. If a handle\key pair was generated before the resource table was resized, then when the resource is next accessed, the kernel would determine that a handle indexes a resource entry that does not correspond to resource identified by the key. When the resource table is resized, the resource entries are typically relocated within the resource table using a hash function that generates indexes based on the new size. When the resource entry does not correspond, the kernel then rehashes the key to get the handle for the resized resource table.

The use of handle\key pairs also allows for compatibility with processes that are designed to use only keys. The system could provide a stub application programming interface in which a resource is identified only by the key. Such a stub application programming interface could then invoke the real application programming interface in which the resource to be accessed is identified by a handle\key pair. The stub application programming interface could pass any value (e.g., 0) as the handle. The system would detect that the resource entry indexed by passed handle does not contain a key that matches the passed key. The system would then rehash and search for the resource entry with a matching key.

Figure 2:
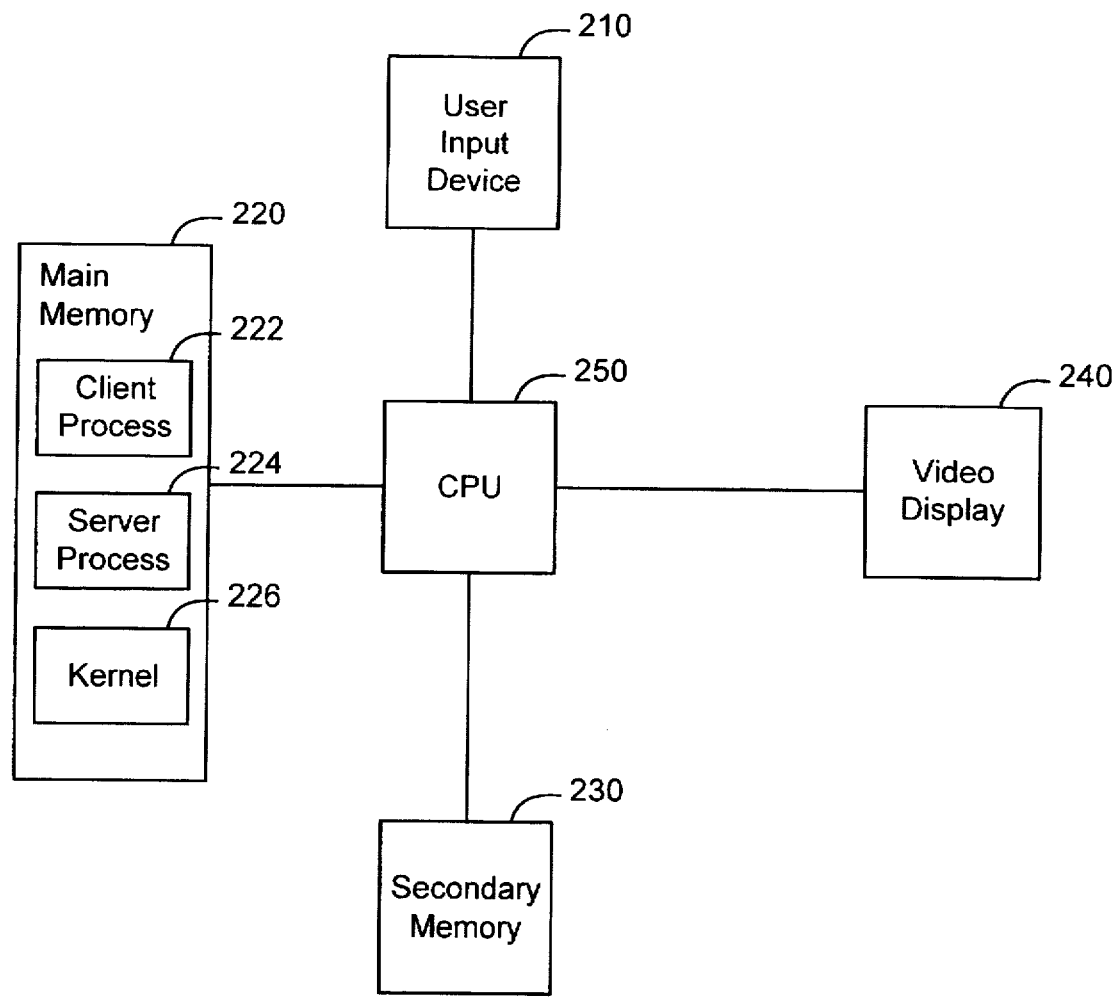
FIG. 2 is a block diagram that illustrates a computer system for practicing the preferred embodiment of the present invention.

FIG. 2 illustrates a computer system for practicing a preferred embodiment of the present invention. As illustrated, the computer system 200 includes a user input device 210, a main memory 220, a secondary memory 230, a video display 240, and a central processing unit 250. These components are interconnected as shown. The main memory contains a client process 222, a server process 224, and a kernel 226. The interaction of these components will be described in more detail below.

Figure 3:
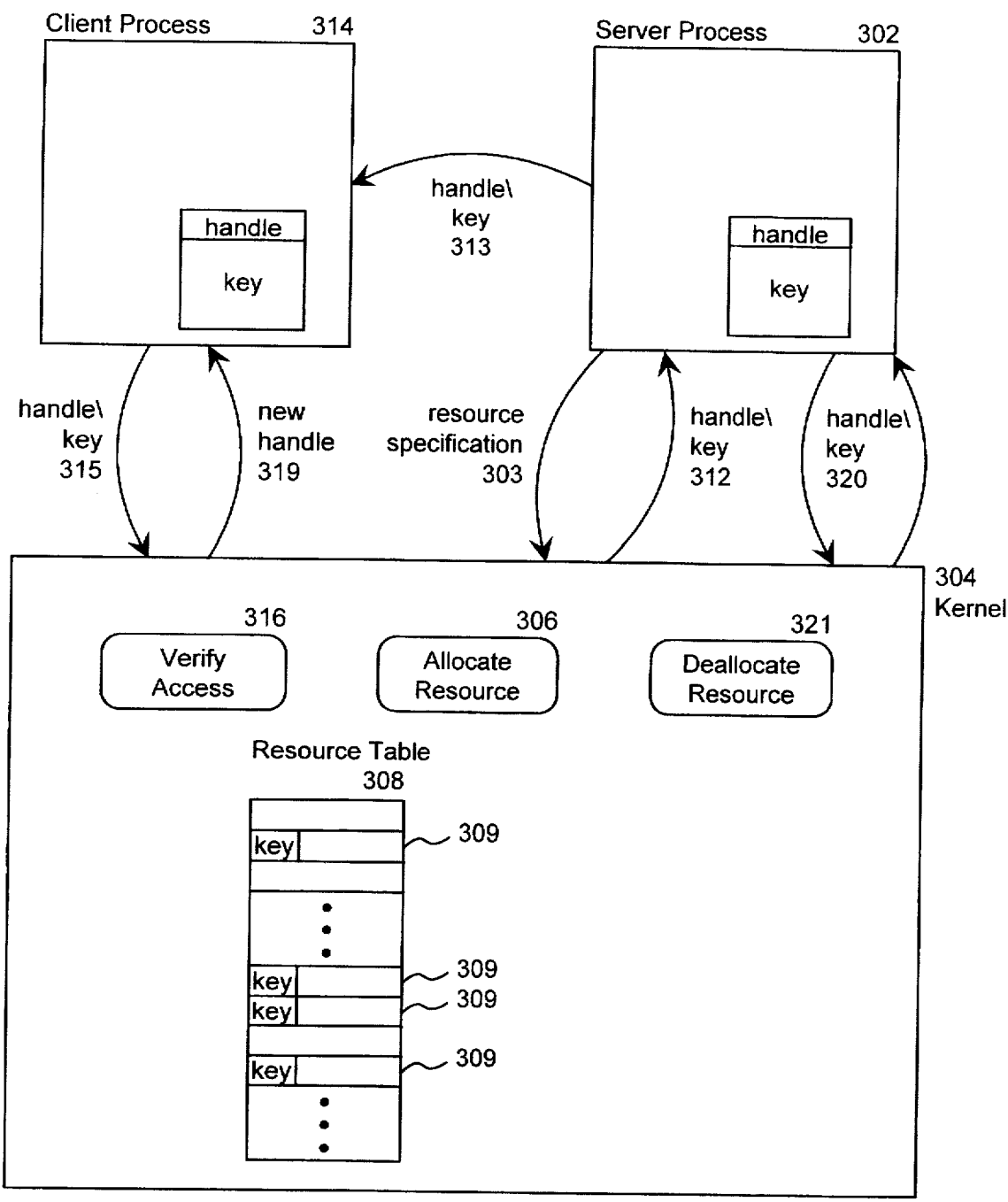
FIG. 3 is block diagram that illustrates data flows of the preferred embodiment of the present invention.

FIG. 3 is a block diagram illustrating data flows of the preferred embodiment of the present invention. More specifically, the diagram illustrates data flows for allocating, accessing, and deallocating resources in the present invention. The server process 302 sends a resource allocation request to the kernel 304. This resource allocation request includes a resource specification 303 that identifies the type of resource (e.g., a block of memory) to allocate. An Allocate Resource Routine 306 of the kernel receives the resource specification and generates a corresponding key. Preferably, this key is a very large, randomly-generated number so that the probability that a malicious process can successfully forge the key is minimized. One skilled in the art would appreciate that the actual size of the key and the method for generating the key depend upon the needs of the operating system. However, in its preferred embodiment, the present invention employs a variant of the RC4 encryption method licensed by Microsoft Corporation to generate 128-bit keys. An example of such a 128-bit key is illustrated in FIG. 4 as four 32-bit numbers shown in hexadecimal form. Since such a key can be one of $2^{128}$ ($\cong 10^{38}$) possible values, it is non-forgeable in the sense that it would be virtually impossible for a malicious process to guess a key.

After generating the key, the Allocate Resource Routine hashes the key using the hash function to obtain an index into the resource table 308 that is used as the handle. One skilled in the art would appreciate that various and well-known hash functions may be used. Preferably, the hash function generates handles that are fairly randomly distributed within the resource table based on the current size of the resource table. The Allocate Resource Routine uses conventional hash table collision resolution techniques (e.g., rehashing, linear probing, or bucketing) when multiple keys hash to the same index. In a preferred embodiment, the Allocate Resource Routine uses the linear probing collision resolution technique to find an available resource entry in the hash table. The Allocate Resource Routine then sets the handle to the index of that available resource entry. The Allocate Resource Routine then allocates the resource using standard resource allocation techniques. The Allocate Resource Routine stores the key and information specifying the allocated resource (e.g., address of a memory block) into the resource entry that is indexed by the handle. )The kernel then returns the handle\key pair 312 to the server process. The server process then passes the handle\key pair 313 to the client process 314 with which the server process desires to share the resource.

When the client process desires to access the shared resource, the client process passes the handle\key pair 315 to the kernel. The kernel invokes the Verify Access Routine 316 to determine whether the client process is authorized to access the resource identified by the handle\key pair. The routine makes this determination by comparing the passed key to the key stored at the resource entry indexed by the passed handle. When a stored key matches the passed key, the kernel allows the client process to access the resource. However, when the passed key does not match, the Verify Access Resource Routine rehashes the passed key to produce a new index. The routine uses linear probing to search for a resource entry that contains a key that matches the passed key. When such a resource entry is not found, the client process is denied access to the resource. On the other hand, when such a resource entry is found, the client process is allowed to access the resource, and the Verify Access Resource Routine returns to the client process the index of the resource entry as a newly-generated handle 319. By providing the client process with the newly-generated handle, the kernel can, for subsequent resource access requests, minimize the need to rehash the key. By avoiding unnecessary rehashing, the present invention minimizes the amount of processing overhead imposed upon the computer system.

When the server process desires to deallocate a resource, it passes the handle\key pair 320 to the kernel. The Deallocate Resource Routine 321 of the kernel first verifies whether the server process is authorized to access the resource by invoking the Verify Access Resource Routine. The Deallocate Resource Routine then deallocates the resource and removes the corresponding resource entry from the resource table.

The kernel can adjust (decrease or increase) the size of the resource table to accommodate resource allocation needs. For example, the kernel may want to increase the size of the resource table when it is full. To resize the resource table, the kernel allocates a new resource table of the desired size. The kernel takes each resource entry from the old resource table and rehashes its key to generate a new handle for (index into) the new resource table. The hash function takes into consideration the size of the new resource table so that the handles are distributed throughout the new resource table. The kernel then moves the resource entry from the old resource table to a resource entry in the new resource table indexed by the new handle. When all the resource entries from the old resource table have been moved to (or relinked into) the new resource table, the kernel deallocates the old resource table. By adjusting the resource table size and rehashing the keys, the present invention minimizes the amount of memory that is needed to store the resource table.

FIGS. 5A-5D illustrate the resizing of a resource table. FIG. 5A illustrates a sample resource table having resource entries for five resources. As illustrated, these entries are identified by their respective handle\key pairs of 4100\0AB . . . 39, 4200\75F . . . D0, 4298\5DE . . . 68, 4299\690 . . . A1, and 4300\AAB . . . 82. The syntax 4100\0AB . . . 39 represents a handle value of 4100 and a 128-bit key that is represented by the first three hexadecimal characters, an ellipsis, and the last two hexadecimal characters. As shown, three keys hash to the same index 4298, and two of those keys are allocated to the next available entry 4299 and 4300.

FIG. 5B illustrates a resource table having resource entries for four resources. More specifically, FIG. 5B represents the resource table of FIG. 5A after the resource entry corresponding to the handle\key pair of 4200\75F . . . D0 has been deallocated and the resource table has been resized. The resource table has been resized from a size of 4200 to a size of 4125. As previously described, the kernel can resize the resource table without impairing the ability of a process to access an allocated resource. For example, initially the correct handle\key pair for the resource with an assigned key of 5DE . . . 68 is 4298\5DE . . . 68 (FIG. 5C). A server process would pass the handle\key pair of 4298\5DE . . . 68 to a client process to authorize the client process to access the corresponding resource. However, when the client process attempts to access this resource after the table has been resized as illustrated in FIG. 5B, the original handle (i.e., 4298) is no longer valid (i.e., the handle indexes beyond the resource table or indexes a resource entry that does not contain a matching key).

When the kernel attempts to access the resource table using the original handle, it discovers that this handle is positioned beyond the boundaries of the resource table. In response, the kernel rehashes the passed key of FIG. 5C (i.e., 5DE . . . 68) to generate a new handle for the key. In this case, the kernel generates a handle of 4125. The kernel then compares the passed key (i.e., 5DE . . . 68) to the key that is referenced by the handle 4125. In this case, the passed key matches the key in the resource entry indexed by the handle 4125 (i.e., 5DE . . . 68). Since the keys match, the client is authorized to access the resource. The kernel then returns the new handle (i.e., 4125) to the client process. As explained above, by informing the client process of the new handle, the kernel ensures that on subsequent resource access requests from this client process, the kernel will first attempt to access the resource using the new handle. Upon receipt of this new handle, the client process replaces the old handle (i.e., 4298) with the new handle (i.e., 4125). The resulting handle\key pair is illustrated in FIG. 5D. By utilizing handle\key pairs in this manner, the present invention provides secure access to resources in a manner that reduces both processing and memory overhead.

Figure 6:
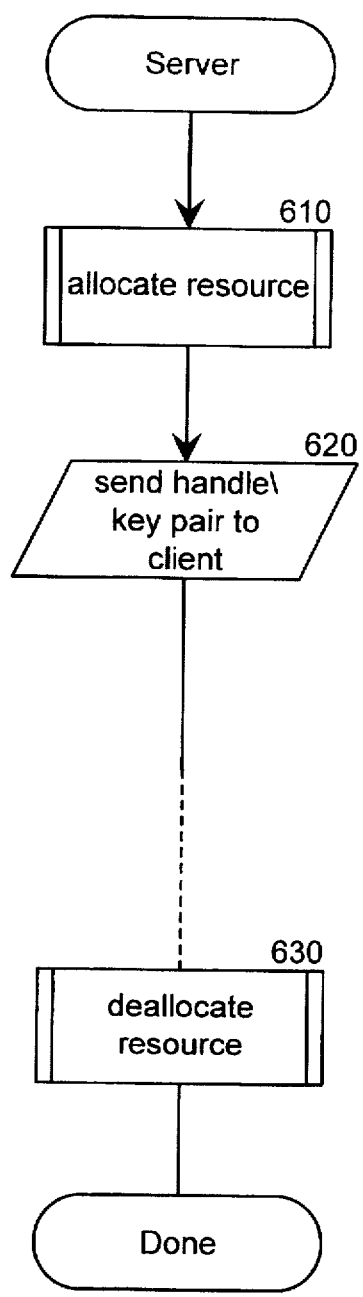
FIG. 6 is a flow diagram of the computer-implemented steps of a server process in the preferred embodiment of the present invention.

FIG. 6 is a flow diagram of the computer-implemented steps of a server process in the preferred embodiment of the present invention. The server process allocates resources by invoking an Allocate Resource Routine contained within the kernel passing a resource specification for the resource to allocate (step 610). The Allocate Resource Routine returns a handle\key pair for the resource. The server process then passes the handle\key pair to a client process with which the server process wishes to share the resource (step 620). At a later time, the server process can deallocate the resource by calling a Deallocate Resource Routine of the kernel passing the handle\key pair for the resource (step 630).

Figure 7:
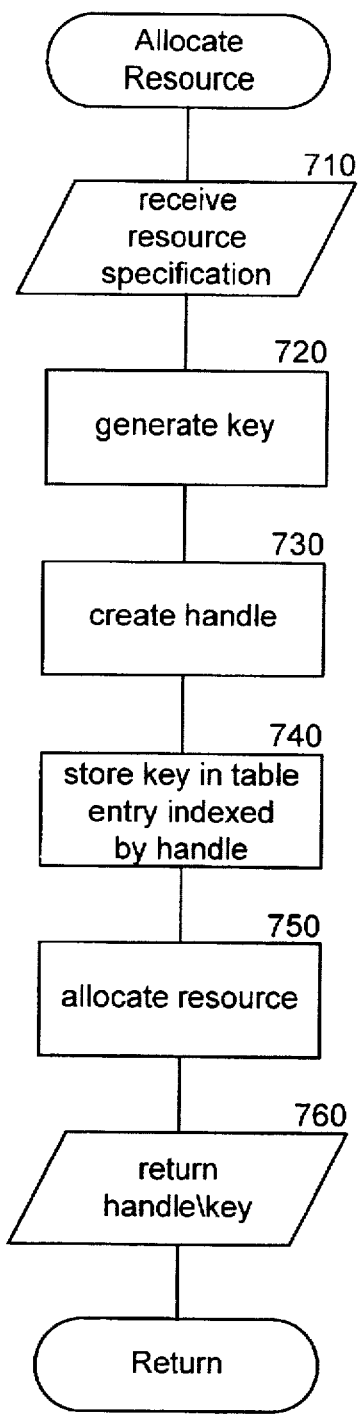
FIG. 7 is a flow diagram of the computer-implemented steps for an Allocate Resource Routine of the preferred embodiment of the present invention.

FIG. 7 is a flow diagram of the computer-implemented steps for the Allocate Resource Routine of the kernel. The Allocate Resource Routine receives a resource specification as input and returns a resource identifier comprising a handle\key pair that corresponds to the resource. This handle\key pair references a resource entry corresponding to the resource. The routine begins by receiving the resource specification from a calling process (e.g., a server process) (step 710). The routine generates a key for the resource identifier and creates a handle for the key (steps 720 and 730). The key is preferably generated by a random number generator, and the handle is generated by a hash function for the resource table. The routine then stores the key in the resource entry of the resource table indexed by the handle (step 740). The routine then allocates the specified resource using standard and well-known techniques that are appropriate to the type of resource (step 750). Finally, the routine returns the handle\key pair to the calling process (step 750).

Figure 8:
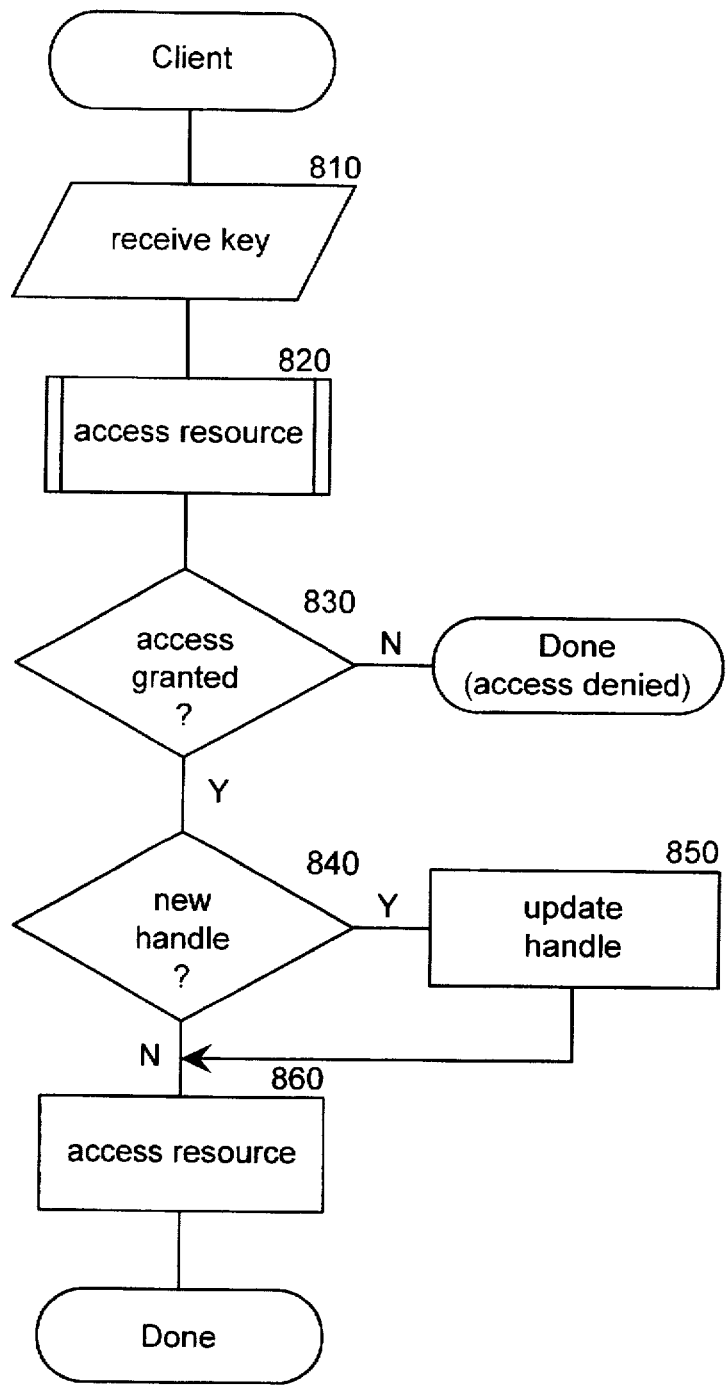
FIG. 8 is a flow diagram of the computer-implemented steps of a client process in the preferred embodiment of the present invention.

FIG. 8 is a flow diagram of the computer-implemented steps of a client process in the preferred embodiment of the present invention. The client process receives a handle\pair key for a shared resource from a server process and uses this handle\key pair to access the shared resource. The client process first receives a handle\key pair from a server process (step 810). The client process attempts to access the resource by invoking an access resource routine of the kernel passing the handle\key pair (step 820). The kernel performs the necessary processing to give the client process access to the shared resource. The kernel returns a new handle for the key when the client process has attempted to access a resource using an old handle. If the kernel denies the client process access to the resource, because a resource identified by the key has not been allocated (e.g., attempted forging), the client process generates a resource denied error message (step 830). If the kernel returns a new handle, the client process replaces the old handle with the new handle (steps 840-850). By updating the handle in this manner, the client process ensures that the kernel will, on subsequent resource access requests, use a more currently generated handle. The client process can then access the resource (step 860).

Figure 9:
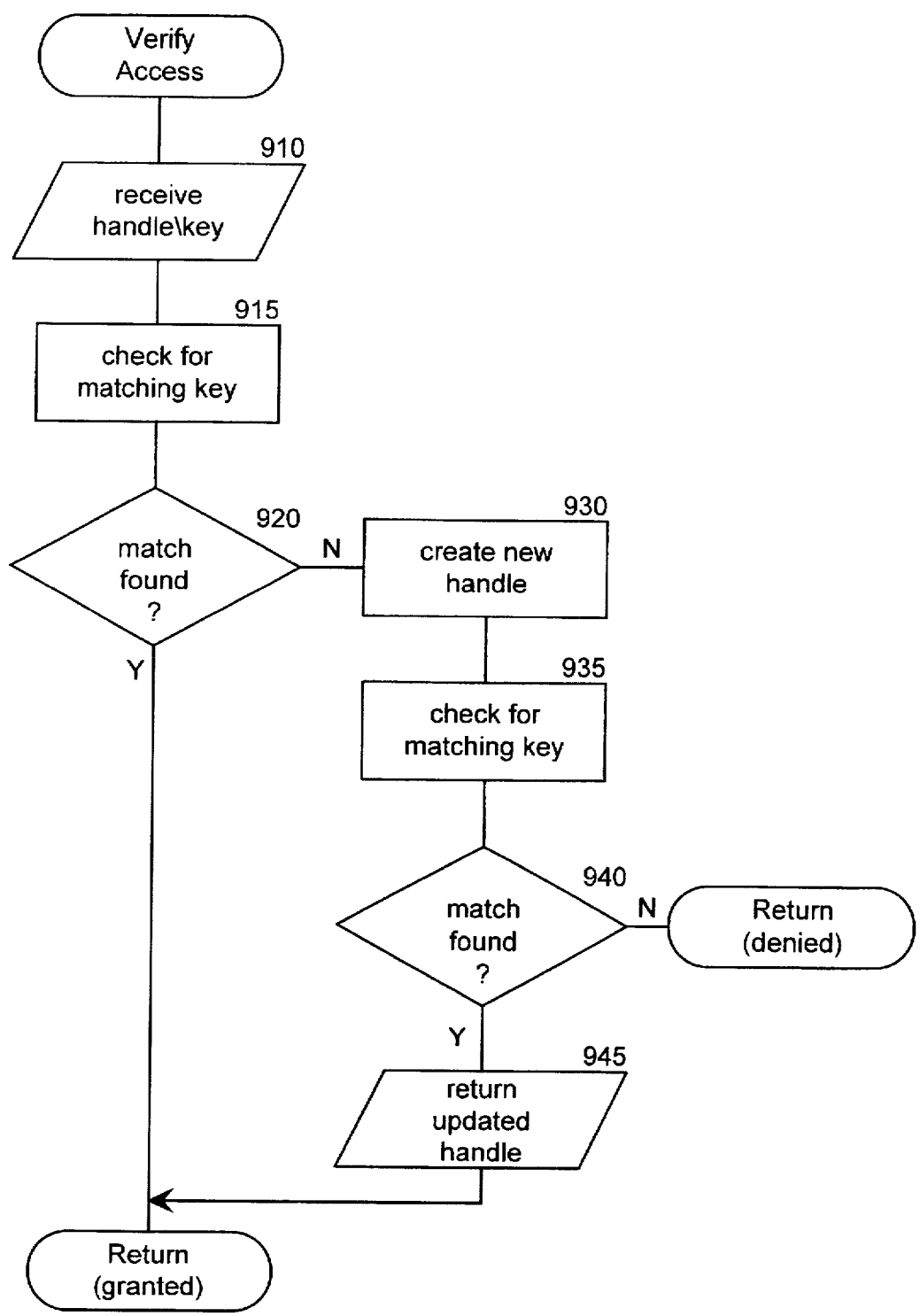
FIG. 9 is a flow diagram of the computer-implemented steps for a Verify Access Routine of the preferred embodiment of the present invention.

FIG. 9 is a flow diagram of the computer-implemented steps for the Verify Access Routine of the kernel. The Verify Access Routine is invoked by the kernel to verify whether a process has authorization to access the resource it is attempting to access. The Verify Access Routine is passed a handle\key pair. The routine begins by inputting the handle\key pair from the kernel (step 910). The routine then checks the key in the resource entry indexed by the passed handle for a match with the passed key (step 915). When the key does match, the routine returns with an indication that access is granted. When the key does not match the passed key, the routine generates a new handle for the passed key (steps 920-930). The routine then checks using linear probing for a key in a resource entry that matches the passed key starting at the key indexed by the new handle (step 935). When a key does match the passed key, the routine returns an updated handle (index to the resource entry with matching key) and an indication that access is granted (steps 940-945). When a key does not match, the routine returns with an indication that access is denied (step 940).

Figure 10:
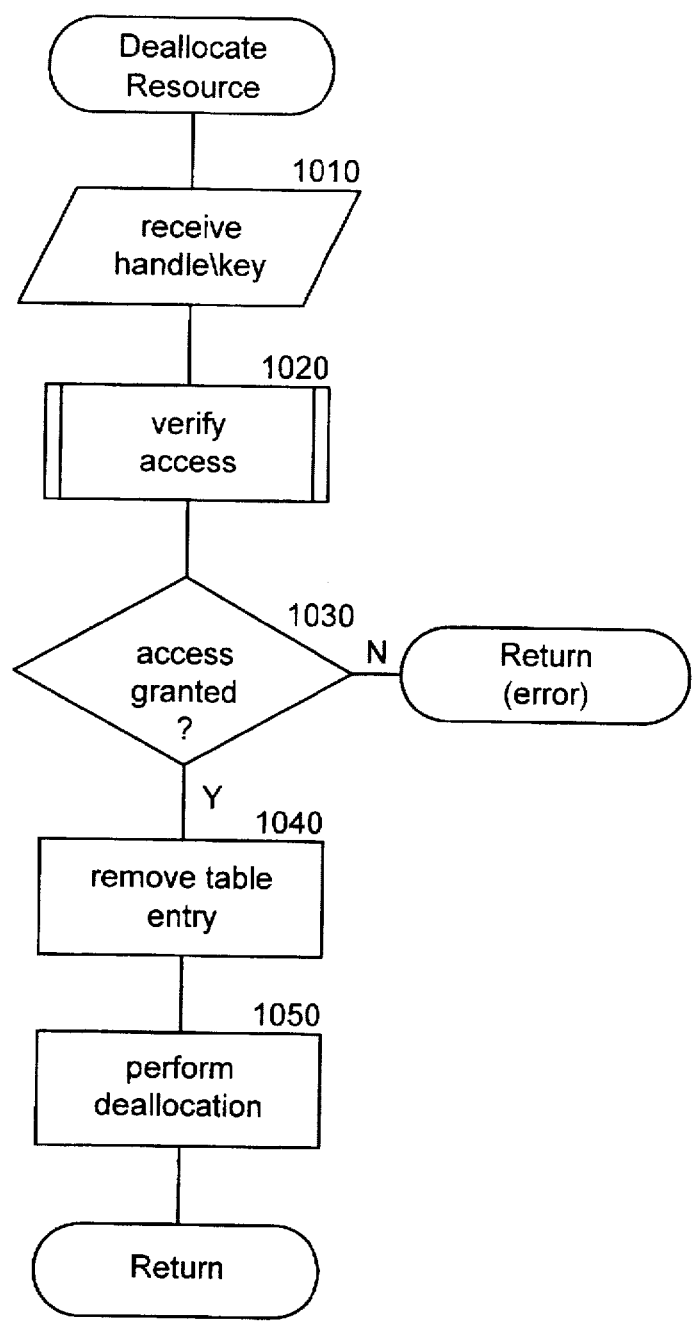
FIG. 10 us a flow diagram of the computer-implemented steps for a Deallocate Resource Routine of the preferred embodiment of the present invention.

FIG. 10 is a flow diagram of the processing steps for the Deallocate Resource Routine of the kernel. The Deallocate Resource Routine is passed the handle\key pair of the resource to be deallocated. The routine then removes the corresponding resource entry from the resource table. The routine receives the first handle\key pair from the kernel (step 1010). The routine then invokes the Verify Access Routine to determine whether the process is allowed to access the resource (step 1020). If access is denied, then the routine returns an access denied indication (step 1030). If access is granted, then the routine removes the corresponding entry from the resource table (steps 1030-1040). The routine then performs the standard processing to deallocate the resource and returns (step 1050).

Figure 11:
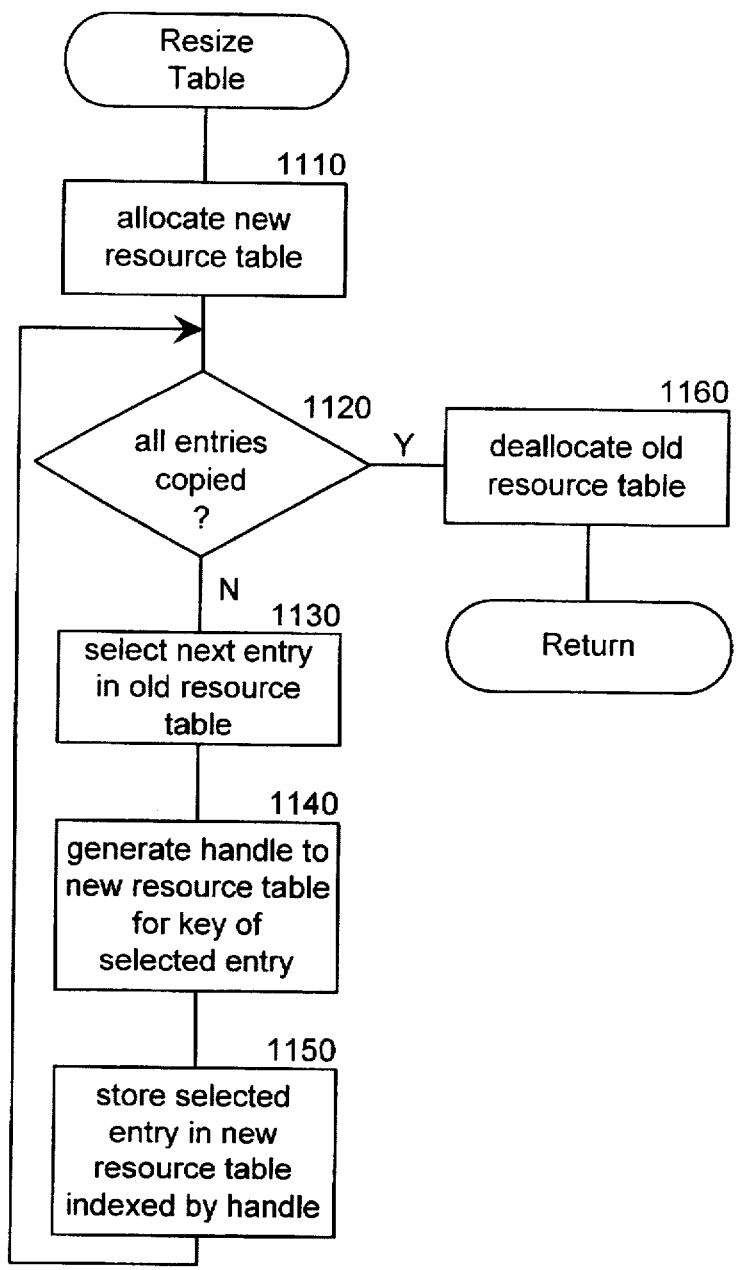
FIG. 11 is a flow diagram of the computer-implemented step for a routine to resize the resource table in a preferred embodiment of the present invention.

FIG. 11 is a flow diagram that illustrates a routine to resize the resource table. The routine allocates a new resource table and moves the resource entries from the old resource table to the new resource table, and then deletes the old resource table. The routine first allocates a new resource table of a designated size (step 1110). The new resource table can be larger or smaller than the old resource table depending on the needs of the kernel. The routine then loops copying each resource entry in the old resource table to the new resource table (steps 1120-1160). When all the resource entries have been copied, the routine then deallocates the old resource table (steps 1120 and 1160). If not all entries have been copied (step 1120), the routine selects a resource entry from the old resource table (step 1130), generates a handle into the new resource table using the key in the selected resource entry (step 1140), and copies the selected resource entry into the new resource table at the resource entry indexed by the handle. The hash function generates indexes into the new resource table based on its size. When a collision occurs, linear probing is preferably used to find an available resource entry.

The detailed discussion provided above represents only a preferred embodiment of the present invention. The above description will enable those skilled in the art to make various modifications to the preferred embodiment that do not depart from the spirit and scope of the invention. One skilled in the art will appreciate that other types of data structures, rather than a hash table, can be used for storing the resource entries. For example, a tree data structure can be used in which the key is used to traverse the tree and the handle is used to directly index a node of the tree. Moreover, the implementation of the data structure can be changed without affecting the validity of the handle/key pairs. Accordingly, the present invention is not limited by the above-described preferred embodiment, but only by the appended claims.

I claim:

1. A method in a computer system for ensuring that a computer program has authorization to access a resource of the computer system, the resource having a unique resource key for indicating authority to access the resource, the method comprising the steps of:

generating a resource data structure in main memory of the computer system, the resource data structure having a plurality of resource entries, each resource entry being referenced by a handle;

storing the resource key in an entry of the resource data structure;

providing to the computer program to enable the computer program to access the resource both the resource key and the handle referencing the entry of the resource data structure in which the resource key is stored;

receiving, from the computer program, a handle and a resource key; and when the received resource key is stored in a resource entry that is referenced by the received handle, granting the computer program access to the resource.

2. The method of claim 1, the method further comprising the step of:

when the received resource key is not stored in the resource entry that is referenced by the received handle, denying the computer program access to the resource.

3. The method of claim 1, the method further comprising the steps of:

when the received resource key is not stored in the resource entry that is referenced by the received handle, determining whether the received resource key is stored in another resource entry in the resource data structure; and when the received resource key is stored in another resource entry, granting the computer program access to the resource.

4. The method of claim 3, the method further comprising the step of:

when the received resource key is stored in another resource entry,
generating a new handle, the new handle being associated with the resource entry that stores the received resource key, and
sending the new handle to the computer program so that, on subsequent attempts to access the resource, the new handle can be used.

5. The method of claim 3 wherein the step of determining whether the received resource key is stored in another resource entry includes the steps of:

generating a new handle based on the received resource key;

retrieving, from a resource entry of the resource data structure that is referenced by the new handle, a resource key; and when the retrieved resource key matches the received resource key, granting the computer program access to the resource.

6. A method for providing secure access to resources of a computer system, the method comprising the steps of:

receiving, from an allocating process, a resource allocation request that specifies a resource;

assigning a key to the resource;

creating a handle for the assigned key;

storing the assigned key in a resource entry of a resource data structure, the resource entry being referenced by the created handle; and sending the created handle and the assigned key to the allocating process so that the allocating process can access the resource by using the created handle to identify the resource and by using the assigned key to indicate authority to access the resource.

7. The method of claim 6, the method further comprising the steps of:

receiving, from an accessing process, a handle and a key;

using the received handle to reference the resource entry;

retrieving the assigned key from the resource entry; and when the received key matches the retrieved assigned key, granting the accessing process access to the resource.

8. The method of claim 7, the method further comprising the step of:

when the received key does not match the retrieved assigned key,
generating a new handle for the received key,
identifying a new resource entry that is referenced by the new handle, and
when the received key matches the assigned key in the new resource entry, granting the accessing process access to the resource.

9. The method of claim 8, the method comprising the step of:

when the received key does not match the assigned key in the new resource entry, denying the accessing process access to the resource.

10. A method for providing secure access to resources of a computer system, the method comprising the steps of:

providing a resource data structure, the resource data structure having an initial size; and allocating a plurality of resources by
generating a resource key for each resource whose possession by any program reflects the possessing program's authorization to access the allocated resource,
generating a handle for the resource key,
storing the resource key in a resource entry of the resource data structure, the resource entry specified by the generated handle, and
providing the resource key and handle for each resource to an allocating program to enable the allocating program to access a resource by supplying the resource key and the handle for the resource.

11. The method of claim 10, further comprising the steps of:

changing the size of the resource data structure from the initial size to a new size; and for each resource entry of the changed resource data structure,
generating a new handle for the resource key stored in the resource entry, and
storing the resource key in a resource entry of the changed resource data structure that is specified by the new handle.

12. A method in a computer system for granting access to a resource of the computer system, the method comprising the steps of:

generating a key that uniquely identifies the resource, the key being generated to minimize likelihood that the key can be forged;

generating a handle based on the key, the handle for identifying a resource entry that contains the key; and when access to the resource is requested by a requestor,
receiving from the requestor a handle and the generated key; using the received handle to identify a resource entry;

when the identified resource entry contains the generated key,
granting to the requestor access to the resource; and when the identified resource entry does not contain the generated key, generating a new handle for the generated key and granting to the requestor access to the resource when a resource entry identified by the new handle contains the key.

13. A method in a computer system for identifying a resource, the method comprising the steps of:

generating a handle\key pair, the key being generated as a non-forgeable identifier of the resource so that possessors of the generated key can use the key to indicate authority to access the resource, the handle being generated to identify a resource entry that identifies the resource, the resource entry containing the generated key; and when accessing the resource,
receiving a handle\key pair;
when the resource entry identified by the received handle contains a key that matches the received key, indicating that the resource has been identified; and
when the resource entry identified by the received handle contains a key that does not match the received key,
generating a new handle for the passed key; and
when the resource entry identified by the new handle contains a key that matches the received key, indicating that the resource has been identified.

14. A computer-readable medium having contents that cause a computer system to ensure that a computer program has authorization to access a resource of the computer system, the resource having a unique resource key for indicating authority to access the resource by performing the steps of:

generating a resource data structure in main memory of the computer system, the resource data structure having a plurality of resource entries, each resource entry being referenced by a handle;

storing the resource key in an entry of the resource data structure;

providing to the computer program to enable the computer program to access the resource both the resource key and the handle referencing the entry of the resource data structure in which the resource key is stored;

receiving, from the computer program, a handle and a resource key; and when the received resource key is stored in a resource entry that is referenced by the received handle, granting the computer program access to the resource.

15. The computer-readable medium of claim 14 wherein the contents of the computer-readable medium further cause the computer system to perform the steps of:

when the received resource key is not stored in the resource entry that is referenced by the received handle, determining whether the received resource key is stored in another resource entry in the resource data structure; and when the received resource key is stored in another resource entry, granting the computer program access to the resource.

16. The computer-readable medium of claim 15 wherein the contents of the computer-readable medium further cause the computer system to perform the step of:

when the received resource key is stored in another resource entry,
generating a new handle, the new handle being associated with the resource entry that stores the received resource key, and
sending the new handle to the computer program so that, on subsequent attempts to access the resource, the new handle can be used.

17. A computer-readable memory containing a resource access data structure adapted to ensuring that computer programs executing in a computer system have authorization to access resources of the computer system, the resource access data structure comprising a multiplicity of resource entries, at least a plurality of the multiplicity of resource entries:

corresponding to a particular resource;

containing a non-forgeable key possessed by programs authorized to access the resource to which the resource entry corresponds; and being referenced by a handle possessed by at least a subset of programs authorized to access the resource to which the resource entry corresponds, such that a program can specify one of the multiplicity of resource entries with the handle that references the specified resource entry and can indicate authority to access the resource to which the specified resource entry corresponds with the non-forgeable key contained in the specified resource entry.

* * * * *